United States Patent [19]

Sano

[11] Patent Number: 4,942,352
[45] Date of Patent: Jul. 17, 1990

[54] NON-CONTACTING POWER SUPPLYING SYSTEM

[75] Inventor: Shigeaki Sano, Fuchu, Japan

[73] Assignee: Toppan Moore Co., Ltd., Tokyo, Japan

[21] Appl. No.: 242,469

[22] Filed: Sep. 9, 1988

[51] Int. Cl.$^5$ ............................................. H02J 7/00
[52] U.S. Cl. ........................................ 320/2; 320/21; 320/32
[58] Field of Search ............................... 320/2, 21, 32

[56] References Cited

U.S. PATENT DOCUMENTS

| | | | |
|---|---|---|---|
| 3,277,358 | 10/1966 | Nicholl | 320/2 X |
| 3,549,990 | 12/1970 | Hochheiser | 323/44 |
| 3,641,336 | 2/1972 | Boin | 320/2 X |
| 3,938,018 | 2/1976 | Dahl | 320/2 |
| 4,031,449 | 6/1977 | Trombly | 320/2 |
| 4,236,086 | 11/1980 | Hobel | 307/149 |
| 4,347,472 | 8/1982 | Lemelson | 320/2 |

FOREIGN PATENT DOCUMENTS

| | | |
|---|---|---|
| 2033682 | 7/1970 | Fed. Rep. of Germany . |
| 2566572 | 6/1984 | France . |
| 62-56014 | of 1987 | Japan . |
| 83/00909 | 6/1983 | PCT Int'l Appl. . |
| 1599412 | 3/1977 | United Kingdom . |

OTHER PUBLICATIONS

Soviet Inventions Illustrated-Derwent week 8715, published 22-04-1987, London & SU-A-1251-193 (Petrodvorets Clock).

Primary Examiner—R. J. Hickey
Attorney, Agent, or Firm—Christensen, O'Connor, Johnson & Kindness

[57] ABSTRACT

Disclosed is a non-contacting power supplying apparatus (10), which couples electrical power to a portable power receiving apparatus (50) that is positionable on the top of the power supplying apparatus (10). In the disclosed embodiments, a power supplying coil (18) of the power supplying apparatus (10) is in spaced-apart juxtaposition with a power receiving coil (54) of the portable power receiving apparatus when the power receiving apparatus (50) is in a predetermined position relative to the power supplying apparatus (10). An electrical signal frequency is induced in the power supplying coil (18) by a frequency converter (16) and is coupled to the power receiving coil (54). A rectifier/filter circuit (56) connected to the power receiving coil (54) supplies a signal for charging a rechargeable battery (58). A control circuit (24), located in the power supplying apparatus (10) activates a switch (14) so that the rechargeable battery (58) can be charged only when the power receiving apparatus (50) is properly positioned on top of the power supplying apparatus (10). A capacitor (20) is connected in parallel with the power supplying coil (18) and resonates with the power supplying coil at a frequency greater than that of the frequency converter (16). In some embodiments, a monitoring circuit (64) is provided for supplying a signal representative of the charge status of the rechargeable battery (58). In these embodiments, the control circuit (28) of power supplying apparatus (10) activates the switch (14) only when the power receiving apparatus (50) is properly positioned relative to the power supplying apparatus (10) and charging of the rechargeable battery (58) is required.

13 Claims, 6 Drawing Sheets

NON-CONTACTING POWER SUPPLYING SYSTEM

FIELD OF THE INVENTION

This invention relates to a non-contacting power supplying system in which electrical power is coupled from power supplying apparatus to separately provided associated power receiving apparatus. The invention is specifically suited for charging of a rechargeable battery that is located in the power receiving apparatus without interconnecting the power receiving apparatus to the power supplying apparatus with switch contacts or other electrical terminal means.

BACKGROUND OF THE INVENTION

Various types of battery powered portable or self contained electrical equipment and apparatus are known in which the one or more batteries that power the equipment are either replaced or recharged to provide continued operation. In many applications equipment that includes one or more rechargeable batteries is placed in or otherwise connected to power supplying apparatus for recharging the batteries with the power supplying apparatus supplying electrical power to the equipment that uses the batteries by means of electrically conductive terminals. Although such an arrangemnt is satisfactory in many applications, situations exist in which it is difficult to provide external electric terminals for battery recharge or to provide an access port for battery exchange. Thus, in many situations, continued use of such equipment has not been possible without at least temporarily substituting new equipment for equipment that contains discharged batteries.

There are disadvantages to electrical terminals even in situations in which electrical terminals can be used to couple electrical power to the equipment for charging of batteries. Specifically, although reliability of conventional electrical terminals generally insures tens to hundreds of coupling operations, coupling the electrical terminals for battery recharging may be needed as often as once to several times each day. Thus, failure of the electrical terminals may occur as early as after one to two years of use.

Commonly employed battery powered equipment also often exhibits other disadvantages. For example, in many situations continuous monitoring of the battery charge status is required to determine when battery recharge is necessary. Often the electric electronic circuitry used for monitoring the battery status consumes a fair amount of electrical power, thus sometimes shortening the interval between battery recharge or replacement.

SUMMARY OF THE INVENTION

The present invention provides an arrangemnt in which the battery or batteries of portable and self contained electrical equipment can be recharged without utilizing electrical contacts to couple electrical power to the equipment for recharging the batteries. In accordance with the invention, the rechargeable battery and the equipment that is powered by one or more batteries is included in power receiving apparatus that can be positioned on top of or otherwise received by power supplying apparatus. In the disclosed arrangements, a power supplying coil is energized at a predetermined frequency only when the power receiving apparatus is in a predetermined positional relationship relative to the power supplying apparatus. Electrical energy is supplied to the power supplying apparatus from conventional power lines with a frequency converter circuit being utilized to provide the signal that excites the power supplying coil. A capacitor is connected in parallel with the power supplying coil for resonance at a frequency that exceeds the frequency of the signal supplied to the power supplying coil. This results in relatively constant battery charging current over a relatively wide range of power line supply voltages.

In some disclosed embodiments of the invention, the status of the rechargeable battery is monitored and a signal representative of the battery status is coupled to the power supplying apparatus without the use of electrical contacts. In these embodiments, the power supplying apparatus is arranged so that a signal is supplied to the power supplying coil to initiate battery charging only when the power receiving apparatus is properly positioned relative to the power supplying apparatus and battery charging is required. In certain of these embodiments, the circuitry that monitors the battery status is powered by a separate backup battery so that battery charging will occur even if the rechargeable battery is discharged to a level that will not provide operating power for the monitoring circuit. In disclosed arrangements of this type, provision is made so that the backup battery is connected to the monitoring circuit only when the power receiving apparatus is properly positioned relative to the power supplying apparatus.

DETAILED DESCRIPTION OF THE DRAWINGS

Figure 1:
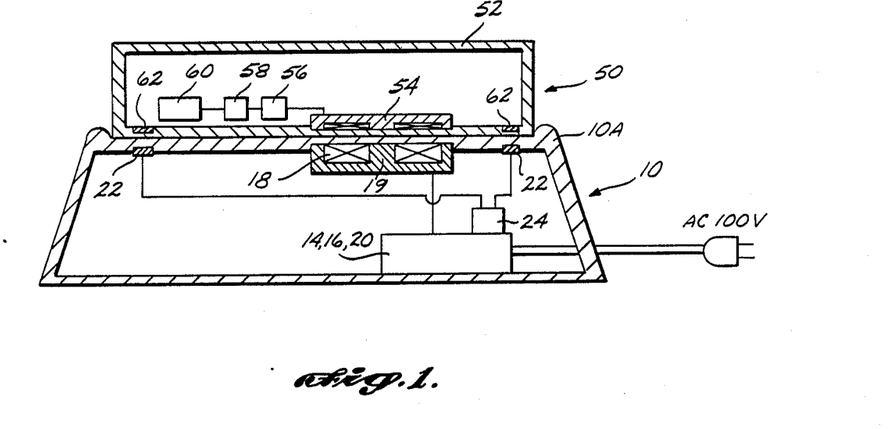
FIG. 1 is a vertical sectional view that depicts the structural arrangement of a first embodiment of the invention.
Figure 2:
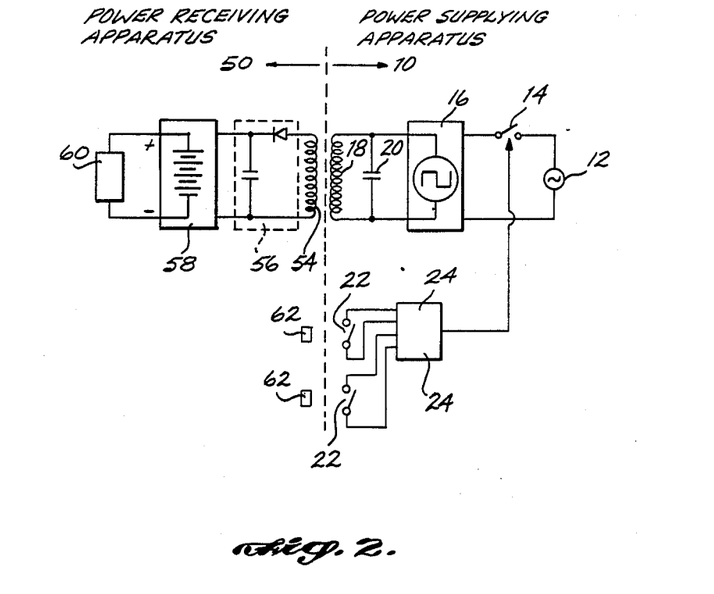
FIG. 2 is a circuit diagram of the embodiment illustrated in FIG. 1.

FIG. 1 schematically illustrates, in vertical section, one embodiment of the invention in which a power supplying apparatus 10 is operatively connected with a power receiving apparatus 50 without the use of metallic contacts or other electrical conductors. FIG. 2 illustrates, in partial schematic, partial block diagram form, a circuit arrangement of this embodiment. In the power supplying apparatus 10, reference numeral 12 designates a commercial AC source; 14 designates a normally open switch (used as a source switch or a power supply on-off switch); 16 designates a frequency converter of phase control type adapted to convert an AC voltage supplied by the commercial AC source 12 to an AC voltage of a predetermined high frequency as will be described later; 18 designates a power supplying coil; and, 20 designates a capacitor of a value that improves power transmission efficiency relative to the magnetic coupling between a power supplying coil 18 and a power receiving coil 54 as also will be described later.

The terminal apparatus 50 includes within an enclosed housing 52 the power receiving coil 54, which is mounted so that it is magnetically coupled to the power supplying coil 18. Also mounted in housing 52 is a rectifier/filter circuit 56 which is connected for receiving the AC voltage supplied by the power receiving coil 54; a chargeable battery 58, which is connected so that it can be charged with a DC voltage supplied by the rectifier/filter circuit 56, and a utilization device 60, which effects the intended function of the terminal apparatus 50. Utilization device 60 can be virtually any battery operated device, such as a light emitting device or a power tool.

Figure 3:
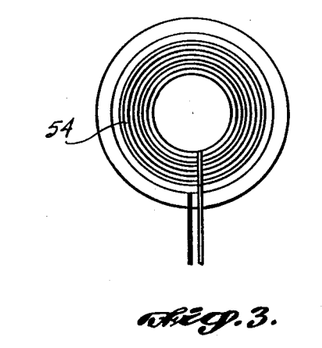
FIG. 3 is a front view of a power receiving coil suitable for use in the practice of the invention.
Figure 4:
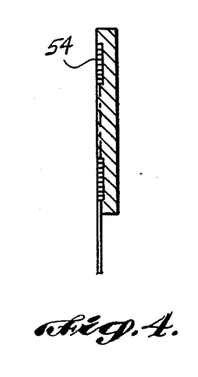
FIG. 4 is a middle sectional view of the power receiving coil of FIG. 3.

The power supplying coil 18 is wound around a ferrite core 19, which preferably is mounted below or flush with the upper surface 10 of a housing 10A of the power supplying apparatus 10. As is shown in FIG. 1, the power supplying coil 18 is positioned in spaced-apart juxtaposition with the power receiving coil 54 of the terminal apparatus 50, with the surfaces of coils 18 and 54 being relatively close to one another when terminal apparatus 50 is properly positioned on top of power supplying apparatus 10. This positions power supplying coils 18 to enhance the magnetic coupling effect to the power receiving coil 54. Currently, the preferred form of the power receiving coil 54 is a thin coil which facilitates efficient interlinkage of the magnetic flux developed from the power supplying coil 18 with the power receiving coil 54. More particularly, the currently preferred power receiving coil 54 is a flat disc-like core on which is formed a single layer or several layers of wire-like electrical conductors. Such conductors can be formed, for example, by depositing conductive material on a side of the disc-like core that faces the power supplying apparatus 10. FIG. 3 is a front view of such a sheet coil and FIG. 4 is a vertical sectional view taken along its middle plane.

From the standpoint of the magnetic coupling efficiency, the power supplying coil 18 preferably has a diameter which is equal to or less than the effective diameter or the minimum diameter of the power receiving coil 54.

Figure 5:
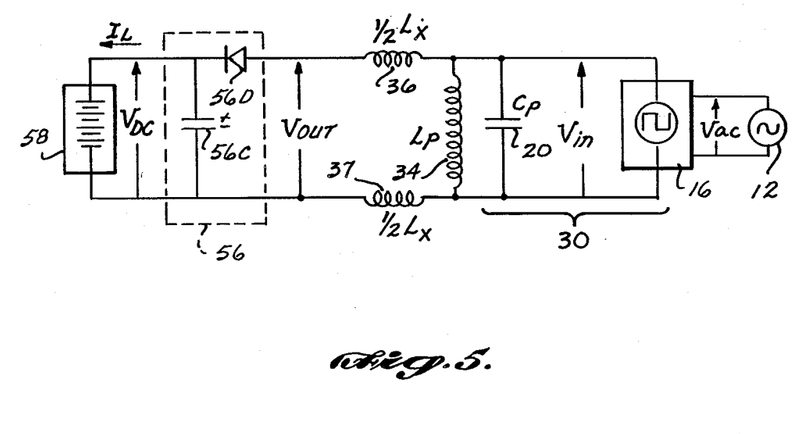
FIG. 5 is a circuit diagram illustrating an equivalent circuit of the magnetic coupling employed in the disclosed embodiments of the invention.

The power supplying coil 18 and the power receiving coil 54 together constitute a transformer of open magnetic path type (i.e., a transformer in which the primary and secondary windings are separated by air or other media of relatively low permeability) with power supplying coil 18 serving as the primary side and the power receiving coil 54 serving as the secondary side. An equivalent circuit for such a transformer is shown in FIG. 5. In FIG. 5, reference numerals 36 and 37 designate inductances having a value corresponding to a half of the leakage inductance $L_x$. Reference numeral 56D designates a rectifying diode, and 56C a smoothing capacitor. A rechargeable battery 58 is charged with a DC voltage $V_{DC}$ supplied from the rectifier/filter circuit 56. As is known in the art, an open magnetic path allows considerable flux leakage to be present. Thus, leakage inductance $L_x$ is relatively large and results in a voltage drop between the primary side voltage $V_{in}$ and the secondary side voltage $V_{out}$. Accordingly, in the practice of the invention, it is advantageous to minimize the leakage flux. In this regard, it is desirable to use a frequency as low as possible, because the voltage drop across the equivalent leakage inductance, $L_x$, is proportional to the frequency of operation. However, to avoid undesired magnetostrictive oscillation sound, the frequency used must be set in the order of 15 KHz or higher. Further, although frequency converter 16 is commonly constructed to produce a rectangular wave having a frequency between 15 and 25 KHz, it should be noted that a higher frequency sometimes is preferable from the standpoint of magnetic coupling efficiency (depending upon the distance between the coils 18 and 54).

In realizations of the invention in which the frequency is within the lower portion of the preferred range, the coils 18 and 54 must have a relatively high inductance so as to maintain a high impedance in the direction from the rectifier/filter circuit 56 to the power receiving coil 54. However, this disadvantageously leads to increased leakage inductance and thereby leads to reduced power transmission efficiency. To overcome this problem, the currently preferred embodiments provide a capacitor 20 connected in parallel with the power supplying coil 18 so that the impedance in the direction starting from the secondary side of the transformer (consisting of the coil 18 and the coil 54) may be increased by resonance. In other words, a value $C_p$ of the capacitor 20 is selected so that, in the equivalent circuit as shown by FIG. 5, an inductance 34 and the capacitor 20 in the state of power supplying resonate in parallel at a frequency higher than that of the current applied to power supplying coil 18 by frequency converter 16. As a result of such selection, the capacitor 20 and the inductance 34 form a source of the resonance frequency $f_R$ and the resonance energy is directed to the load, collectively improving the power supplying efficiency.

Figure 6:
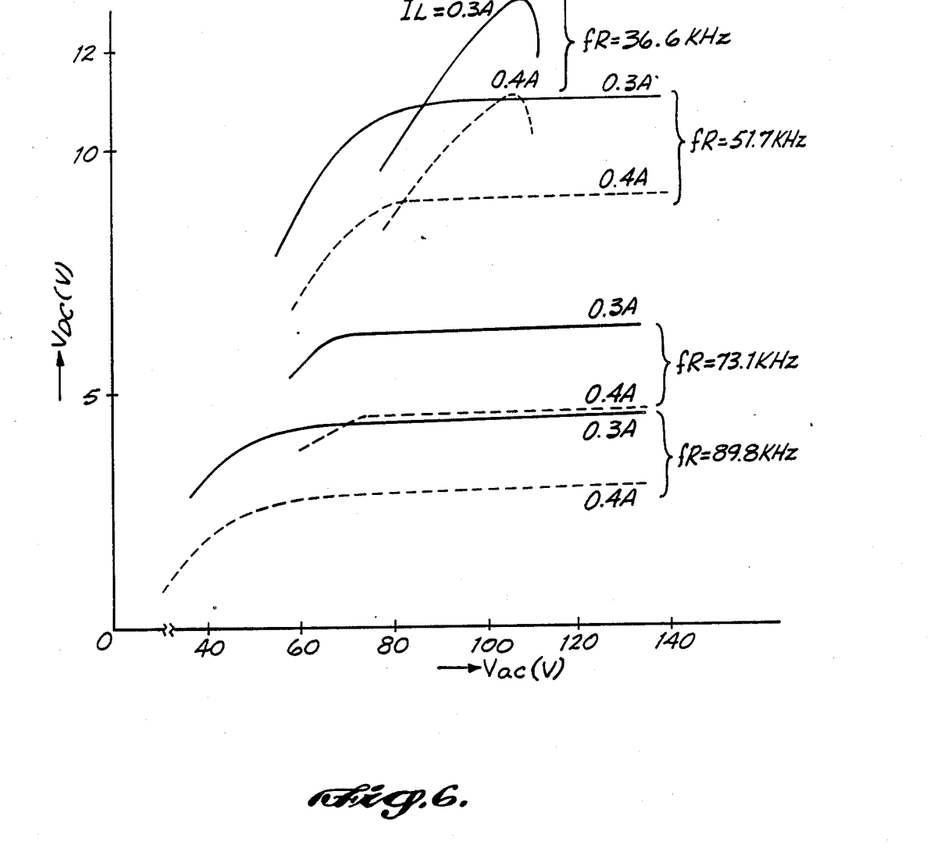
FIG. 6 graphically depicts the operational characteristics of a typical embodiment of the invention, illustrating variation in battery charging voltage at several changing currents and frequencies of operation.

It has been experimentally found that, when the coils 18 and 54 are spaced from each other by 3 mm and the frequency converter 16 supplies a signal of 100 V at a frequency, $f_o$ of 25 KHz, the output DC voltage $V_{DC}$ and the load current $I_L$ of rectifier/filter circuit 56 of the type shown in FIG. 5 exhibit characteristics as shown in FIG. 6. As is shown in FIG. 6, when the resonant frequency $f_R$ was set to a level as low as approximately 1.5 times of the output frequency $f_o$ of the frequency converter 16 (36.6 KHz), the DC voltage $V_{DC}$ changed substantially relative to variation in the AC input voltage, $V_{ac}$. However, when the capacity of the capacitor 20 was selected so that the resonant frequency $f_R$ is 1.5 times $f_o$ or higher, particularly on the order of 2 $f_o$ or more (51.7 KHz in FIG. 6), a stable power in the order of 3 VA was obtained from the rectifier/filter circuit 56 in spite of relatively wide ranging variation in the AC input voltage. As will be appreciated from FIG. 6, oscillation at a frequency of 2 $f_o$ was optimal from the standpoint of maximum circuit efficiency. More specifically, the maximum output of 3.6 W was obtained when the AC source 12 was set to provide a voltage $V_{ac}$ of 100 V and an output current of 0.4 A. The output in the order of 3 VA was obtained at a power transmission efficiency of approximately 40%. This is a capability comparable to that achieved in arrangements that utilize metal contacts (electrical terminals) instead of coils 18 and 54.

With the arrangement of FIG. 1, power is supplied from the power supplying apparatus 10 to the power receiving apparatus 50 only after proper placement of the power receiving apparatus 50 on top of the power supplying apparatus 10. To this end, in the embodiment of FIG. 1, the upper surface of the power receiving apparatus 50 (which faces the power supplying apparatus 10) is provided at single or plural locations with magnets 62. Embedded in the surface of the power supplying apparatus 10 that faces the power receiving apparatus 50 are reed switches 22, which close in response to magnets 62 when receiving magnetically-actuated apparatus 50 is properly positioned on the power supplying apparatus 10 so that the power supply coil 18 is in spaced-apart juxtaposition with the power receiving coil 54. Upon closure of all the reed switches 22, a switch control circuit 24 generates a switch closing signal which in turn activates (closes) the switch 14. Closure of the switch 14 activates the frequency converter 16 to thereby supply power to the power receiving apparatus 50 through magnetically coupled power supplying coil 18 and power receiving coil 54.

In this manner, only after the power receiving apparatus 50 has been properly placed, will the magnets 62 and the corresponding reed switches 22 cause the switch control circuit 24 to generate the switch closing signal so that power supplying apparatus 10 can supply power to the power receiving apparatus 50. Therefore, the circuitry of power supplying apparatus 10 is activated only when charging of battery 60 may be required, thereby minimizing the potential for accidental damage to circuit components.

Position detection for the power receiving apparatus 50 may be achieved not only by the above-mentioned combination of magnets 62 and reed switches 22, but also by a combination of magnets and Hall effect devices, a photocoupler, a mechanical microswitch, or an arrangement in which the bottom surface of the power receiving apparatus 50 is partially made reflective while the power supplying apparatus 10 is provided with a light emitting element and light receiving element that is responsive to light reflected from a properly positioned power receiving apparatus.

Figure 7:
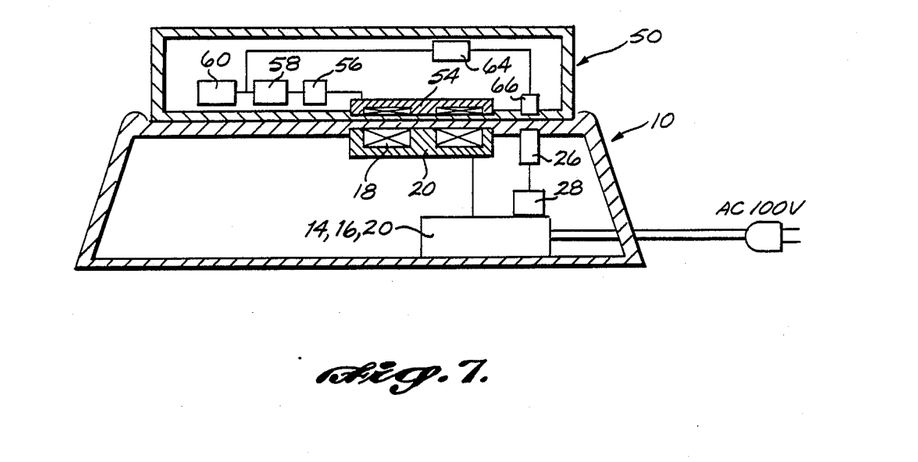
FIG. 7 is a vertical sectional view illustrating a second embodiment of the invention.
Figure 8:
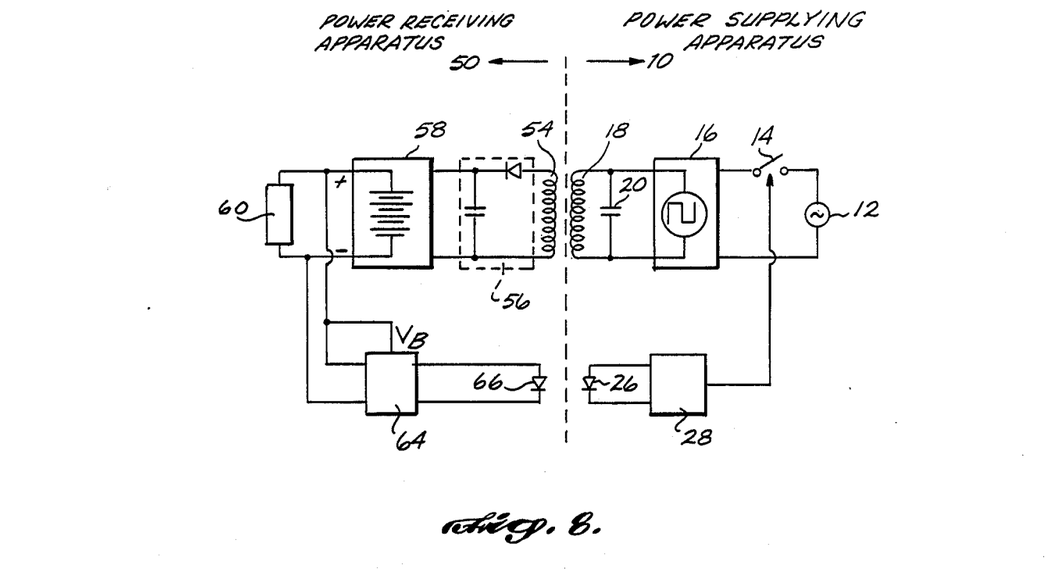
FIG. 8 is a circuit diagram of the embodiment illustrated in FIG. 7.

FIGS. 7 and 8 illustrate an embodiment of the present invention, which is constructed so that the output voltage of the rechargeable battery 60 of the power receiving apparatus 50 is monitored and a signal is coupled to the power supplying apparatus 10 to indicate whether the battery need be charged or not. FIG. 7 schematically illustrates this embodiment in vertical section and FIG. 8 illustrates a circuit arrangement thereof. It should be understood that the similar components or elements to those in FIGS. 1 and 2 are designated by similar reference numerals.

In FIGS. 7 and 8, reference numeral 64 designates a monitoring circuit to monitor the output voltage of the rechargeable battery 58. Power consumption by this monitoring circuit 64 is very small and therefore the bias voltage necessary for this monitoring circuit 64 can be taken from the output voltage of the rechargeable battery 58. When the output voltage of the battery 58 becomes lower than a predetermined value, the monitoring circuit 64 activates a light emitting diode 66. Like the magnet 62 in the embodiment of FIG. 1, the light emitting diode 66 is located on the surface of the power receiving apparatus 50 (facing the top of the power supplying apparatus 10). Mounted on the power supplying apparatus 10 is a light receiving element 26. The light emitting diode 66 and the light receiving element 26 together form a so called photocoupler. So long as the light receiving element 26 receives the light from the light emitting diode 66, a switch control circuit 28 continues to supply the switch 14 with a signal which maintains switch 14 in the closed condition.

According to the embodiment as shown by FIG. 7, proper placement of the power receiving apparatus 50 on the top of the power supplying apparatus 10 necessarily results in alignment of the light emitting diode 66 with the corresponding light receiving element 26. If the output DC voltage of the rechargeable battery 58 is lower than a predetermined value, the monitoring circuit 64 will activate the light emitting diode 66 and, as a consequence, a power supply signal will be applied to the power supplying apparatus 10. Specifically, when the light receiving element 26 receives the light from the light emitting diode 66, the switch control circuit 28 applies the switch closing signal to the switch 14. As a result, the frequency converter 16 is activated and, thus, power is supplied to the rechargeable battery 58 through the coils 18 and 54.

When the rechargeable battery 58 has been charged to a predetermined voltage, the monitoring circuit 64 de-energizes the light emitting diode 66. As a consequence, the switch control circuit 28 causes the switch 14 to open so as to stop coil 18 from supplying power to coil 54.

In the fully charged condition, the output DC voltage level of the rechargeable battery 58 is generally higher than it is when the rechargeable battery 58 is in need of recharging. Thus, in the preferred arrangements the monitoring circuit 64 exhibits two distinct thresholds. This can be achieved, for example, by applying the output voltage of the rechargeable battery 58 to a comparator for comparison with a single threshold via an RC integrating circuit having a long time constant (or an analog delay line).

With the embodiment of FIG. 7, unnecessary charging is avoided because power is supplied only when charging is necessary. It will be appreciated that light emitting diode 66 and light receiving element 26 also can serve the function provided by magnets 62 and reed switches 22 of FIG. 1. In such a case, the switch control circuit 28 will serve also as the switch control circuit 24, i.e., to apply the switch closing signal to the switch 14 when the power receiving apparatus 50 has been properly placed and charging is necessary.

Figure 9:
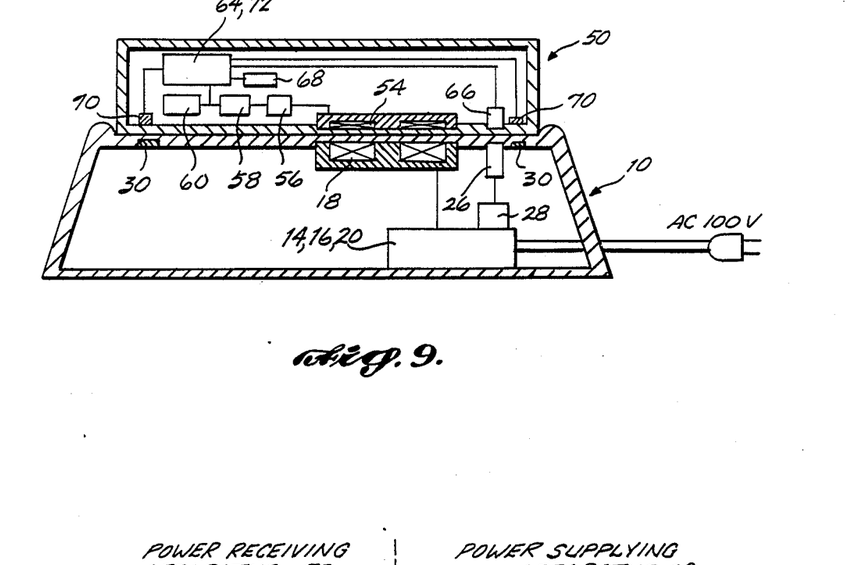
FIG. 9 is a vertical sectional view illustrating a third embodiment of the invention.
Figure 10:
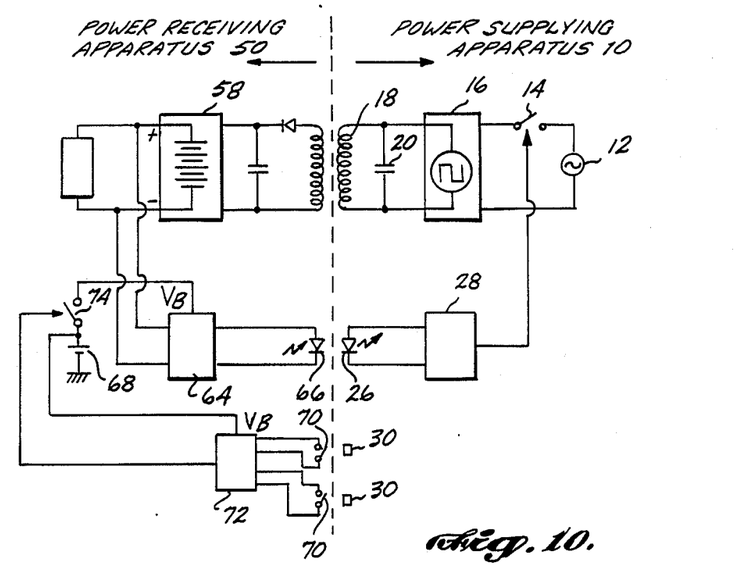
FIG. 10 is a circuit diagram of the embodiment illustrated in FIG. 9.

FIGS. 9 and 10 illustrate modification of the embodiment shown by FIG. 7 to provide a backup source 68 (e.g., a battery) for the sole purpose of supplying power to the monitoring circuit 64 so that the power supply signal can be applied to the power supplying apparatus 10 even after the rechargeable battery 58 has been significantly consumed. In the arrangement of FIGS. 9 and 10, the power receiving apparatus 50 is provided with means for detecting that the power receiving apparatus 50 is properly placed on top of the power supplying apparatus 10, and in response to a detection signal that is provided to these means, the voltage supplied from the backup source 68 is applied to the monitoring circuit 64 so as to activate the monitoring circuit 64.

More particularly, the embodiment of FIGS. 9 and 10 includes an arrangement which is inverse to the embodiment of FIG. 1 in that the surface of the power supplying apparatus 10 that faces the power receiving apparatus 50 is provided at single or plural locations with magnets 30 while the power receiving apparatus 50 is provided on its lower surface with reed switches 70, which are responsive to (closed by) the corresponding magnets 30. A logic circuit 72 generates, upon closure of all the reed switches 70 a closing signal for a switch 74. In arrangements in which the logic circuit 72 is an electronic circuit, some power must be provided to logic circuit 72 by the backup source 68. In other arrangements, both the logic circuit 72 and the switch 74 can be eliminated with switch 74 being replaced by the serially connected reed switches 70. Thus, the circuit arrangement required for providing a backup source 68 is not limited to the arrangement that is illustrated in FIG. 10. Generally, it is the required current carrying capabilities that determine whether a switch 74 is used (relatively high current capability) or serially connect reed switches 70 are employed (lower current capacity).

Although it is not shown in FIGS. 9 and 10, the backup source 68 can be charged with the DC voltage supplied from the rectifier/filter 56 as occasion demands.

With the embodiment shown by FIG. 9, when the power receiving apparatus 50 is properly placed on the top of the power supplying apparatus 10, the reed switches 70 of the power receiving apparatus 50 are necessarily in alignment with the corresponding magnets 30 of the power supplying apparatus 10. Thus, the reed switches 70 are closed. So long as all the lead switches 70 are closed, the logic circuit 72 generates the closing signal with which the switch 74 is closed. The monitoring circuit 64 is thereby activated to monitor the output DC voltage of the rechargeable battery 58 and, if the output DC voltage is lower than a first predetermined value, activates the light emitting diode 66. When the light receiving element 26 receives the light from the light emitting diode 66, the switch control circuit 28 applies the closing signal to the switch 14. As a consequence, the power receiving apparatus 50 is supplied with power.

When the rechargeable battery 58 has been charged to a predetermined voltage, the monitoring circuit 64 de-energizes the light emitting diode 66 and thereby the switch control circuit 28 applies an opening signal to the switch 14, stopping power supply.

With the embodiment of FIG. 7, the light emitting diode 66 continues to emit light whenever the output voltage level of the rechargeable battery 58 is lower than a predetermined value. This feature is advantageous in that a warning is provided to the user, but results in additional power consumption. With the embodiment of FIG. 9, on the other hand, the monitoring circuit 64 is activated upon the proper placement of the power receiving apparatus 50 on the power supplying apparatus 10 and therefore there is no unnecessary activation of the light emitting diode 66 with a result of minimum power consumption.

With further respect to the embodiment of FIG. 7, when the rechargeable battery 58 is at or near total discharge, the battery voltage may not be adequate for activation of the monitoring circuit 64. If this is the case, no power will be supplied to recharge the battery. As a countermeasure to this potential problem, there may be provided the backup source 68 as has been described in reference with FIG. 9. Alternatively, the embodiment of FIG. 7 can be arranged so that the switch 14 is maintained closed by the power supplying apparatus 10 at least for a short period until the DC voltage level at which the monitoring circuit 64 can be activated is reached to thereby supply receiving apparatus 50 with power permitting normal activation of the monitoring circuit 64.

Figure 11:
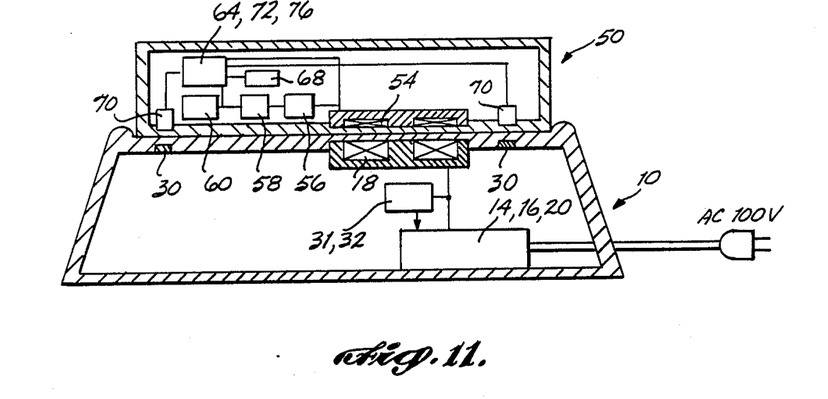
FIG. 11 is a vertical sectional view illustrating a fourth embodiment of the invention.
Figure 12:
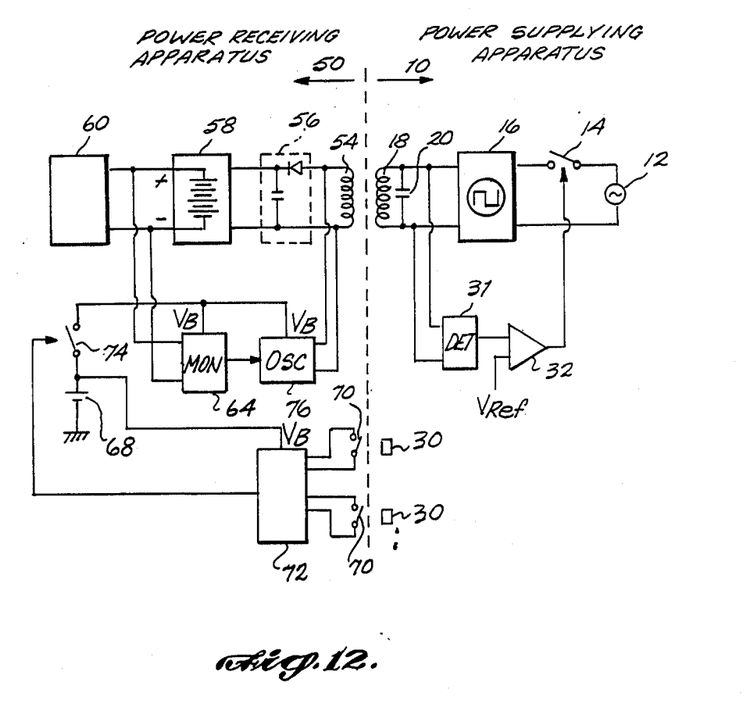
FIG. 12 is a circuit diagram of the embodiment illustrated in FIG. 11.

FIGS. 11 and 12 illustrate a variation of the embodiment of FIG. 9 in which the power supply signal transmitting system, i.e., the combination of light emitting diode 66 and light receiving element 26 that is used in the embodiment of FIG. 9, is replaced by the combination of power supplying coil 18 and power receiving coil 54. In considering the embodiment shown in FIGS. 11 and 12, it should be understood that like elements of FIGS. 9, 11 and 12 are designated by identical reference numerals. The embodiment of FIGS. 11 and 12 also includes an oscillator circuit 76 which is responsive to the power supply signal applied from the monitoring circuit 64 and supplies an AC signal of a predetermined frequency to the power receiving coil 54. The oscillation frequency of the oscillation circuit 76 may be selected so that the signal transmitted to the power supplying apparatus 10 is of a desired level even when the coils 18 and 54 constitute a transformer of open magnetic path type. In the power supplying apparatus, reference numeral 31 designates a conventional circuit for detecting the level of the AC signal provided by the power supplying coil 18, and reference numeral 32 designates a comparator for comparing the output voltage of the detector 31 with a predetermined reference voltage $V_{ref}$. If the output voltage of the detector 31 is lower than the reference voltage $V_{ref}$, the comparator 32 will apply the closing signal to the switch 14.

With the embodiment of FIGS. 11 and 12, upon the proper placement of the power receiving apparatus 50 on the top of the power supplying apparatus 10, all the reed switches 70 are closed by the magnets 30 and the output of the logic circuit 72 causes the switch 74 to be closed. Upon closure of the switch 74, the monitoring circuit 64 is activated and will supply the power supply signal to the oscillator circuit 76 if the output DC voltage of the rechargeable battery 58 is lower than a predetermined threshold. The oscillator circuit 76 is responsive to this power supply signal to apply the AC signal of a predetermined frequency to the power supplying apparatus 10 through the magnetic coupling of the power receiving coil 54 and the power supplying coil 18. The detector 31 detects the AC signal of a predetermined frequency coming from the power receiving apparatus 50 and when the output of the detector 31 is higher than a predetermined reference value the comparator 32 applies the closing signal to the switch 14. Upon closure of the switch 14, the frequency converter 16 is activated and thus power is supplied to the power receiving apparatus 50.

When the rechargeable battery 58 has been adequately charged and the output DC voltage thereof exceeds a predetermined threshold, the monitoring circuit 64 ceases to generate the power supply signal and the oscillation circuit 76 provides no further output.

The detector 31 may be a circuit adapted to detect only the signal having the oscillation frequency of the oscillator circuit 76 or may be a circuit adapted to also detect the signal having the alternating frequency output from the frequency converter 16. In the former case, upon completion of the charging, the switch 14 is opened and no further power is supplied to power receiving apparatus 50. In the latter case, even after the oscillator circuit 76 has been deactivated upon completion of the charging, the detector 31 continues to detect the output of the frequency converter 16 and maintains the switch 14 closed.

Although the magnetic coupling type has been described as the non-contacting power supplying system, it is not intended that the present invention be limited to such magnetic coupling. For example, it is intended that a photocoupling arrangement be within the scope of the invention, in which case the power supplying apparatus 10 is provided with a light emitting element while the power receiving apparatus is provided with a solar cell.

Other changes and modifications can be made without departing from the scope and spirit of the invention. For example, with respect to the power supply signal transmitting system consisting of the light emitting diode 66 and the light receiving element 26 (FIGS. 8 and 10), it is preferred to interpose an infrared transmitting filter and/or to flash the light emitting diode 66 so as to thereby exclude any influence of external light.

As will be readily understood from the foregoing description, the present invention enables relatively high electric power to be transmitted at a high efficiency in non-contacting fashion. The present invention maintains the electrical connection in non-contacting fashion and therefore is very useful for electrical equipment or apparatus placed in an environment which must be extremely clean, or an environment which is extremely severe, such as an enclosed environment, or in an inflammable or explosive atmosphere. The invention also is useful with respect to equipment or devices in which it is difficult to supply power via ordinary electrical connections. Further, wasteful and unneeded supplying of power is avoided, since no power is supplied unless the power receiving apparatus is placed in a proper positional relationship relative to the power supplying apparatus. Power supplying efficiency is further improved by monitoring the output level of the rechargeable battery in the power receiving apparatus and controlling the power supply according to the result of monitoring. Moreover, the battery can be automatically charged by housing the power supplying apparatus within a specified space of the power receiving apparatus, saving human monitoring.

The embodiments of the invention in which an exclusive property or privilege is claimed are defined as follows:

1. A non-contacting power supplying system comprising:
    a power supplying apparatus including a power supplying coil, signal supplying means for supplying a signal at a predetermined frequency, switch means responsive to an applied switching signal for interconnecting said signal supplying means with said power supplying coil to provide said signal at said predetermined frequency to said power supplying coil when said switching signal is supplied to said switch means, and a capacitor connected in parallel with said power supplying coil to establish resonance at a resonant frequency that is at least 1.5 times greater than said predetermined frequency, said power supplying apparatus further including switch control means responsive to a position detection signal for supplying said switching signal to said switch means;
    a portable power receiving apparatus including a power receiving coil, said portable power receiving apparatus being positionable in a predetermined spatial relationship with said power supplying apparatus to electromagnetically couple said power receiving coil of said power receiving apparatus with power supplying coil of said power supplying apparatus; and
    position detection means for supplying said position detection signal to said switch control means of said power supplying apparatus when said portable power receiving apparatus is in said predetermined spatial orientation with said power supplying apparatus.

2. The non-contacting power supplying system of claim 1 wherein said resonant frequency is on the order of at least two times said predetermined frequency.

3. The non-contacting power supplying system of claim 2 wherein said position detection means includes one or more magnets mounted in said portable power receiving apparatus and one or more magnetically operated switching means mounted in said power supplying apparatus with each said magnet being mounted for operation of a corresponding one of said magnetically operated switching means when said portable power receiving apparatus is in said predetermined spatial orientation with said power supplying apparatus, said one or more magnetically operated switching means supplying said position detection signal to said switch control means when said portable power receiving apparatus is said predetermined spatial orientation with said power supplying apparatus.

4. The non-contacting power supplying system of claim 2 wherein said position detection means includes a light emitting device mounted in said portable power receiving apparatus and a light activated switching means mounted in said power supplying apparatus with said light emitting device being mounted to supply light to said light activated switching means when said portable power receiving means is in said predetermined spatial orientation with said power supplying apparatus, said light activated switching means supplying said position detection signal to said switch control means when said portable power receiving means is in said predetermined spatial orientation with said power supplying means.

5. The non-contacting power supplying system of claim 1 wherein said portable power receiving apparatus includes a rechargeable source of electrical power and monitoring means connected to said rechargeable source of electrical power for supplying a status signal that indicates said rechargeable source of electrical power is in need of recharging, said power receiving apparatus further including circuit means connected to said power receiving coil for supplying a charging signal to said rechargeable source of electrical power, said non-contacting power supplying system further including means for coupling said signal representative of said status of said rechargeable source of electrical power to said switch control means of said power supplying apparatus, said switch control means including means for supplying said control signal to said switch means to interconnect said power supplying coil with said signal means when said power receiving apparatus is in said predetermined spatial orientation with said portable power supplying apparatus and said status signal indicates said rechargeable source of electrical power is in need of recharging.

6. The non-contacting power supplying system of claim 5 wherein said means for coupling status said signal representative of said status of said rechargeable source of electrical power to said switch control means includes a light emitting device mounted in said portable power receiving apparatus and a light activated switching means mounted in said power supplying apparatus with said light emitting device being energized by said status signal and being mounted to supply light to said light activated switching means when said portable power receiving apparatus is in said predetermined spatial orientation with said power supplying apparatus, said light activated switching means supplying said position detection signal to said switch control means when said portable power receiving apparatus is in said predetermined spatial orientation with said power supplying apparatus and said rechargeable source of electrical power is in need of charging.

7. The power supplying apparatus of claim 6 wherein said resonant frequency is on the order of at least two times said predetermined frequency.

8. The noncontacting power supplying system of claim 5 wherein said portable power receiving apparatus further includes a backup battery for supplying operating power to said monitoring means and also includes means for connecting said backup battery to said monitoring means only when said portable power receiving apparatus is in said predetermined spatial orientation.

9. The non-contacting power supplying apparatus of claim 8 wherein said means for connecting said backup battery to said monitoring means includes an electrically-operable switch interposed between said backup battery and said monitor means and further includes logic means connected for operating said electrically-operable switch, said logic means being responsive to said position detection signal for connecting said backup battery to said monitoring means when said portable power receiving apparatus is in said predetermined spatial orientation with said power supplying apparatus.

10. The non-contacting power supplying system of claim 9 wherein said power receiving apparatus includes an oscillator activated by said status signal and connected for supplying a signal to said power receiving coil and wherein said power supplying apparatus includes signal detection means connected to said power supplying coil for detection of said signal supplied by said oscillator to said power receiving coil, said signal detection means including means for supplying said switching signal to said switch means to interconnect said signal supplying means with said power supplying coil when said oscillator provides said signal to said power receiving coil.

11. The non-contacting power supplying system of claim 9 wherein said position detection means includes one or more magnets mounted in said portable power receiving apparatus and one or more magnetically operated switching means mounted in said power supplying apparatus with each said magnet being mounted for operation of a corresponding one of said magnetically operated switching means when said portable power receiving apparatus is in said predetermined spatial orientation with said power supplying apparatus, said one or more magnetically operated switching means supplying said position detection signal to said logic means when said portable power receiving apparatus is in said predetermined spatial orientation with said power supplying apparatus.

12. The non-contacting power supplying system of claim 9 wherein said means for coupling said signal representative of said status of said rechargeable source of electrical power to said switch control means includes a light emitting device mounted in said portable power receiving apparatus and a light activated switching means mounted in said power supplying apparatus with said light emitting device being energized by said status signal and being mounted to supply light to said light activated switching means when said portable power receiving apparatus is in said predetermined spatial orientation with said power supplying apparatus, said light activated switching means supplying said position detection signal to said switch control means when said portable power receiving apparatus is in said predetermined spatial orientation with said power supplying apparatus and said rechargeable source of electrical power is in need of charging.

13. The non-contacting power supplying system of claim 12 wherein said position detection means includes one or more magnets mounted in said portable power receiving apparatus and one or more magnetically operated switching means mounted in said power supplying apparatus with each said magnet being mounted for operation of a corresponding one of said magnetically operated switching means when said portable power receiving apparatus is in said predetermined spatial orientation with said power supplying apparatus, said one or more magnetically operated switching means supplying said position detection signal to said logic means when said portable power receiving apparatus is in said predetermined spatial orientation with said power supplying apparatus.

* * * * *